United States Patent [19]

Birchem et al.

[11] Patent Number: 6,136,048
[45] Date of Patent: Oct. 24, 2000

[54] ORGANIC SOL COMPRISING AT LEAST ONE OXYGENATED RARE-EARTH COMPOUND, SYNTHESIS METHOD THEREFOR, AND USE OF SAID SOL FOR CATALYSIS

[75] Inventors: Thierry Birchem, Paris; Pierre MacAudiere, Asnieres; Olivier Touret, La Rochelle, all of France

[73] Assignee: Rhodia Chimie, Courbevoie Cedex, France

[21] Appl. No.: 09/068,925

[22] PCT Filed: Nov. 22, 1996

[86] PCT No.: PCT/FR96/01852

§ 371 Date: Nov. 19, 1998

§ 102(e) Date: Nov. 19, 1998

[87] PCT Pub. No.: WO97/19022

PCT Pub. Date: May 29, 1997

[30] Foreign Application Priority Data

Nov. 22, 1995 [FR] France .................................... 95 13844

[51] Int. Cl.⁷ .............................. C10L 1/30; B01J 23/10; C01F 17/00
[52] U.S. Cl. ................................ 44/354; 44/364; 516/33; 502/302; 502/303; 502/304
[58] Field of Search ........................ 44/354, 364; 516/33; 502/302, 303, 304

[56] References Cited

U.S. PATENT DOCUMENTS

| | | | |
|---|---|---|---|
| 3,759,786 | 9/1973 | Abate-Daga et al. | 44/354 |
| 4,522,631 | 6/1985 | Mourao | 44/354 |
| 4,599,201 | 7/1986 | Gradeff et al. | 423/263 |
| 5,376,304 | 12/1994 | Yamamoto et al. | 516/33 |
| 5,449,387 | 9/1995 | Hawkins et al. | 44/354 |
| 5,496,528 | 3/1996 | David | 423/263 |
| 5,688,439 | 11/1997 | Chopin et al. | 516/33 |

FOREIGN PATENT DOCUMENTS

| | | |
|---|---|---|
| 0 671 205 | 1/1989 | European Pat. Off. . |
| 0 297 937 | 9/1995 | European Pat. Off. . |
| 988330 | 4/1965 | United Kingdom . |
| 2075478 | 5/1980 | United Kingdom . |

*Primary Examiner*—Jacqueline V. Howard
*Attorney, Agent, or Firm*—Burns, Doane, Swecker & Mathis, L.L.P.

[57] ABSTRACT

A method for processing soot containing one or more rare earths, wherein said soot is contacted with an oxygen-containing gas, is disclosed. The method comprises (a) preparing an aqueous phase comprising a dispersion of at least one oxygenated metal compound; (b) simultaneously or consecutively contacting a suspension from step (a) with an organic phase including at least one amphiphilic agent and preferably an organic mixture or compound as the solvent; and (c) recovering the organic phase. Said oxygenated metal compound is produced by means of a method according to which a solution including at least one soluble rare-earth salt, usually an acetate and/or a chloride, is prepared; the solution is contacted with a basic medium and the resulting reaction mixture is maintained at a basic pH; and the precipitate formed by atomization or freeze-drying is recovered. Said method is useful in inorganic synthesis and catalysis.

51 Claims, No Drawings

ORGANIC SOL COMPRISING AT LEAST ONE OXYGENATED RARE-EARTH COMPOUND, SYNTHESIS METHOD THEREFOR, AND USE OF SAID SOL FOR CATALYSIS

FIELD OF THE INVENTION

The subject of the present invention is an organic sol containing at least one oxygenated rare-earth compound, a process for synthesizing the said sol and the use of the said sol for catalysis. It relates more particularly to the synthesis of particles of one or more oxygenated compounds within an aqueous phase, and to the extraction of the said particles within an organic phase so as to form an organic sol.

BACKGROUND OF THE INVENTION

Aqueous sols of oxides of certain metals are known, but it is already more difficult to find descriptions of organic sols. Only sols, or colloidal solutions, of certain metals are described; with regard to sols of mixtures of metals, if they are described as such, they correspond to mixtures of metals only insofar as they involve an impurity (or impurities) caused by the precipitation of a main element.

Moreover, organic sols are mostly prepared from aqueous sols, but the particles of the aqueous sols are generally poorly adapted for extraction in an organic solvent. In order to obtain organic sols, it is therefore necessary to select the aqueous sols from which the organic sols will be made and often to provide a post-treatment for the purpose of rendering them extractable.

Even the preparation of aqueous sols is often difficult and it is necessary to find techniques which allow the production of individual particles having good dispersibility in water (the sol constituting merely a kind of dispersion).

Furthermore, for many uses, these sols must be stable and withstand various external conditions (temperature, stirring, etc.).

Thus the sols may form catalysts, or sources of catalysts, in organic liquid phase. The solo of catalysts may be used for drying paint (in general, crosslinking) and for catalysing the combustion of fuels, in particular for eliminating or greatly reducing the pollution by diesel engines using the technique described below.

The use as an additive for diesel engines constitutes a good example of the constraints with which such a sol must comply.

In the combustion of diesel fuel in a diesel engine, the carbonaceous products have a tendency to form soot, which is reputed both to be harmful both to the environment and to one's health. Techniques have been sought for a long time which allow a reduction in the emission of these carbonaceous particles which, in the rest of the description, will be referred to by the term "soot".

Many solutions have been proposed for reducing these carbonaceous emissions.

However, exhaust circuits are being increasingly fitted with a filter capable of stopping all, or a very high proportion (at least 80% by mass), of the carbonaceous particles generated by the combustion of various fuels.

This technique is, however, limited by the storage capacity of the filter, which either has to be emptied or the soot contained therein has to be burnt off. This so-called regeneration operation is extremely expensive to provide and to implement. One of the solutions most commonly proposed is the combustion of this soot, which combustion is brought about, intermittently, either by electrical heating or by the use of a fossil igniter fuel.

However, this technique has many drawbacks, not the least of which is the risk of thermal shock leading to fracture or cracking of a ceramic filter or to melting of a metal filter.

Another solution which would be satisfactory consists in introducing, into the soot, catalysts which allow frequent spontaneous combustion of the soot collected in the filter. To do this, it is necessary for this soot to have a spontaneous ignition temperature low enough to be frequently reached during normal running of the engine.

SUMMARY OF THE INVENTION

In the course of the research programme which led to the present invention, it has been proven that organic sols, especially cerium sols, could form a good catalyst precursor for reducing the spontaneous ignition temperature of the soot.

However, in order to be used in a convenient manner and to meet regulatory provisions, it is intended for the additives to be gradually introduced, as required, from a reservoir which need only be replaced every 50,000 kilometres.

Under these conditions, the additives must be both highly concentrated and sufficiently stable to not be in any way affected by the agitation conditions associated with running the vehicle and by the multi-year interval between two replacements.

This is why one of the objects of the present invention is to provide organic sols of oxides and in particular rare-earth oxides, which are very stable.

This stability must apply not only when the sol is concentrated but also when the sol is diluted.

Another object of the present invention is to provide a sol of the above type which is concentrated.

Another object of the present invention is to provide a sol of the above type which consists of oxygenated compounds of several metals, if so required.

Another object of the present invention is to provide a process for preparing sols of the above types.

These objects and others which will appear later are achieved by means of a sol preparation process which comprises the following steps:

(a) preparing an aqueous phase comprising at least one oxygenated metal compound in dispersion;

(b) bringing into contact, simultaneously or consecutively, a suspension from step (a) with an organic phase including at least one amphiphilic agent and preferably an organic mixture or compound acting as solvent; and then (c) recovering the organic phase; and in which the said oxygenated metal compound is obtained by a process comprising the steps below:

α) a solution including at least one soluble rare-earth salt, usually an acetate and/or a chloride, is prepared;

β) the solution is brought into contact with a basic medium and the reaction mixture thus formed is maintained at a basic pH; and γ) the precipitate formed is recovered by atomization or freeze-drying.

The expression "rare earths" should be understood to mean the elements whose atomic number is between 57 and 71 (including the limits) as well as scandium and yttrium.

According to an advantageous variant of the present invention, the process can be used for preparing mixed compounds. To do this, the said oxygenated metal compound is based on at least one rare earth and on at least one other metallic element chosen from Groups IVa, VIIa, VIII, Ib, IIb, IIIb and IVb of the Periodic Table of the Elements [The Periodic Table of the Elements to which reference is made is that published in the Supplement to the Bulletin of the Chemical Society of France No. 1 (January 1966)] and then a mixture is prepared which includes, at least as counter anion, a high proportion (at least ½, advantageously ¾ and preferably 9/10 by weight) of anions which do not complex or complex only weakly with the metals in solution. As an example of a non-complexing anion, mention may be made of (per)halogenates, nitrates and sulphonates. However, it is often furthermore preferable for the anions not to be capable of oxidizing the cations introduced, which limits the choice. It is also desirable for the anions not to be amphiphilic.

Given the above constraints, a good compromise consists in using as anion a high proportion of anions chosen from organic anions (in particular carboxylates and sulphonates, the carbon chain of which has a short length [at most five, advantageously at most 3, and preferably at most 2 carbon atoms]), halides of the row above fluorine and mixtures thereof.

Thus acetates and/or chlorides, as well as mixtures thereof, are suitable as anions of the said metallic element in solution. As mentioned above, the said solution may furthermore include at least one salt and/or a sol of one or more metallic elements.

Thus:

the aforementioned mixture is brought into contact with a basic medium and the reaction mixture thus formed is maintained at a basic pH; and the precipitate formed is recovered by atomization or freeze-drying.

Moreover, the invention relates to an organic colloidal suspension (or sol) based on at least one rare earth and optionally on at least one other element chosen from Groups IVa, VIIA, VIII, IB, IIB, IIIB and IVB of the Periodic Table of the Elements, obtained from compounds prepared as above and having a dispersibility in water of at least 50%.

In the present description, the characteristics of the particle size distribution often refer to notations of the $d_n$ type, where n is a number from 1 to 99; this notation is well known in many technical fields but is a little more unusual in chemistry—it is therefore worthwhile reminding the reader of its meaning. This notation represents the particle size such that n% (by mass) of the particles is less than or equal to the said size.

The particle size of the oxygenated compound in the above colloid is such that its $d_{90}$ is at most 20 nm (measured by HRTEM, i.e. by High-Resolution Transmission Electron Microscopy), more particularly at most 10 nm and preferably at most 5 nm (nanometres) and such that its nitrate content is at most 1000 ppm.

DETAILED DESCRIPTION OF PREFERRED EMBODIMENTS

The process for preparing the particles of compound(s) in the form of the sol according to the present invention will first of all be described.

The first step [step α)] of the process consists in preparing, usually in the form of a solution or suspension, the element or a mixture of the elements which are involved in the composition of the compound which it is desired to obtain. This solution or suspension includes a soluble salt, usually a rare-earth acetate and/or chloride and optionally at least one salt or a sol of another element chosen from Groups IVa, VIIa, VIII, Ib, IIb, IIIb and IVb of the Periodic Table of the Elements. In the rest of the description of this first step and of the following step for bringing this solution or suspension into contact with a basic medium, to simplify matters the term mixture will be used to denote the solution or suspension of the element or of the mixture of the elements which are involved in the composition of the compound.

With regard to the rare earth, this may more particularly be chosen from cerium, yttrium, neodymium, gadolinium, praseodymium and lanthanum. In the case of the use of the compounds of the invention in catalysis, cerium, lanthanum, neodymium, yttrium and praseodymium are preferred. It is also possible to use, in the context of this invention, a mixture consisting mostly of cerium and including a relatively low proportion [at most equal to approximately (in the present description, the term "approximately" is employed for indicating the fact that, when the numeral or numerals furthest to the right of a number are zeros, these zeros are zeros of position and not significant numerals, except, of course, if it is specified otherwise) 10% and more generally to 5% by mass] of elements having other valencies and present either by way of dopants or as impurities.

In the case of the optional other element, mention may be made more particularly of zirconium, the transition elements having a d subshell in the course of being filled, especially the elements of column VIII (especially those of the first row existing), copper and manganese.

With regard to the salts, it is preferred to use an acetate for the rare earth or rare earths. In the case of the other element or elements, mention may be made, as salts, of chlorides or carboxylic acid salts such as acetates, oxalates or formates. When it is possible, an acetate is preferably used.

The next step [step β)] consists in bringing the aforementioned mixture into contact with a basic medium. By basic medium should be understood to mean any medium having a pH greater than 7. The basic medium will normally be an aqueous solution containing a base. Products of the hydroxide type may be used, in particular, as base. Mention may be made of alkali metal or alkaline-earth metal hydroxides. It is also possible to use secondary amines, tertiary amines or quaternary ammonium hydroxides. However, amines and aqueous ammonia are preferable insofar as they reduce the risks of pollution by alkali metal cations or, above all, alkaline-earth metal cations. Mention may also be made of urea (under conditions where the diamide, which the urea is, releases ammonia).

Finally, with respect to the preparation of a compound based on cerium and on zirconium using a cerium chloride, the bases mentioned above are most particularly used, preferably avoiding the use of carbonates or hydroxide carbonates.

The aforementioned mixture is brought into contact with the basic medium under conditions such that the pH of the reaction mixture that is thus formed remains basic.

Preferably, this pH value will be at least 9. More particularly, it may be at most 11. Even more particularly, this value may be between 9.5 and 11.

The aforementioned mixture is brought into contact [step β)] with the basic medium by introducing the mixture into the basic medium. It is also possible to carry out the contacting operation continuously, the pH condition being fulfilled by adjusting the respective flow rates of the mixture and of the basic medium.

According to one particular variant of the invention, it is possible to work under conditions such that, when bringing the mixture into contact with the basic medium, the pH of the reaction mixture thus formed is kept constant. Such conditions may be obtained by adding, when introducing the mixture into the basic medium, an additional quantity of base to the mixture formed.

The contacting operation is usually performed at room temperature.

After the reaction, a precipitate or a suspension is obtained which may be separated, if necessary, from the reaction mixture by any known means. The separated product may be washed.

The subsequent drying operation [step γ)] or, more generally, the recovery of the precipitate may especially be performed using a process of the spray-drying or freeze-drying type (the first of the two is preferred).

According to a preferred embodiment of the invention, the separation of the precipitate from the reaction mixture, and its drying, is performed by atomization, that is to say by spraying the mixture into a hot atmosphere. The atomization may be achieved by means of any spray device known per se, for example a spray nozzle of the sprinkling-rose type or of another type. It is also possible to use so-called turbine atomizers. With respect to the various spraying techniques capable of being used in the present process, reference may particularly be made to the standard work by Masters entitled "Spray-drying" (second edition, 1976, published by George Godwin, London).

It should be noted that it is also possible to use the spray-drying operation by means of a "flash" reactor, for example of the type developed by the Applicant and described, for instance, in French Patent Applications Nos. 2,257,326, 2,419,754 and 2,431,321. In this case, the treating gases (hot gases) are made to undergo a helical motion and flow out through a vortex sink. The mixture to be dried is injected along a path coincident with the axis of symmetry of the helical paths of the said gases, thereby allowing perfect transfer of the momentum of the gases to the mixture to be treated. In fact, the gases thus provide a two-fold function, namely, on the one hand, the spraying, i.e. the conversion into fine droplets, of the initial mixture and, on the other hand, the drying of the droplets obtained. Moreover, the extremely short residence time (generally less than approximately $\frac{1}{10}$th of a second) of the particles in the reactor has the advantage, inter alia, of limiting any risk of overheating as a result of excessively long contact with the hot gases.

Depending on the respective flow rates of the gases and of the mixture to be dried, the gas inlet temperature is between 400 and 900° C., and more particularly between 600 and 800° C., the temperature of the dried solid being between 110 and 250° C., preferably between 125 and 200° C.

With regard to the flash reactor mentioned above, reference may particularly be made to FIG. 1 of French Patent Application 2,431,321.

This reactor consists of a combustion chamber and of a contact chamber composed of a bicone or of a truncated cone whose upper part diverges. The combustion chamber runs into the contact chamber via a small passage.

The top of the combustion chamber is provided with an opening allowing introduction of the combustible phase.

Furthermore, the combustion chamber includes a coaxial internal cylinder, thus defining inside the chamber a central region and an annular peripheral region, which has perforations located mostly towards the top of the apparatus. The chamber includes at least six perforations distributed in at least one circle, but preferably in several axially spaced circles. The total surface area of the perforations located in the bottom of the chamber may be very small, of the order of $\frac{1}{10}$ to $\frac{1}{100}$ of the total surface area of the perforations of the said coaxial internal cylinder.

The perforations are usually circular and have a very small thickness. Preferably, the ratio of the diameter of these perforations to the wall thickness is at least 5, the minimum wall thickness being only limited by mechanical requirements.

Finally, an angled pipe runs into the small passage, the end of which opens into the axis of the central region.

The gas phase, undergoing a helical motion (hereafter, called the helical phase) is composed of a gas, generally air, introduced into a hole made in the annular region, preferably this hole being located in the bottom part of the said region.

In order to obtain a helical phase at the small passage, the gas phase is preferably introduced at low pressure into the aforementioned hole, i.e. at a pressure of less than 1 bar and more particularly at a pressure of between 0.2 and 0.5 bar above the pressure existing in the contact chamber. The velocity of this helical phase is generally between 10 and 100 m/s and preferably between 30 and 60 m/s.

Moreover, a combustible phase which in particular may be methane, is injected axially via the aforementioned opening into the central region at a velocity of approximately 100 to 150 m/s.

The combustible phase is ignited by any known means in the region where the fuel and the helical phase are in contact with each other.

Thereafter, the gases have to pass through the small passage in a series of paths coincident with families of generatrices of a hyperboloid. These generatrices are based on a family of small circles or rings located close to and below the small passage, before diverging in all directions.

Next, the mixture to be treated is introduced in the form of a liquid via the aforementioned pipe. The liquid is then divided into a multitude of drops, each of them being transported by a volume of gas and made to undergo a motion which creates a centrifugal effect. The flow rate of the liquid is usually between 0.03 and 10 m/s.

The ratio between the intrinsic momentum of the helical phase and that of the liquid mixture must be high. In particular, it is at least 100 and preferably between 1000 and 10,000. The momenta in the small passage are calculated depending on the input flow rates of the gas and of the mixture to be treated, as well as of the cross-section of the said passage. An increase in the flow rates results in a coarsening of the size of the droplets.

Under these conditions, the intrinsic motion of the gases is forced, in its direction and intensity, on the drops of the mixture to be treated, these being separated from one another in the region of convergence of the two streams. In addition, the velocity of the liquid mixture is reduced to the minimum necessary for obtaining a continuous flow.

After the drying and/or separation step, a compound according to the invention is obtained which will now be described more specifically.

In the case of a compound based only on rare earths, this compound is an amorphous product based on a rare-earth oxide or oxide hydroxide and on anions of the precursor of the rare earth. It may be in the form of a core based on at least one rare-earth oxide or oxide hydroxide or on an oxide hydroxide chloride or oxide hydroxide acetate surrounded by anions of the precursor of the rare earth. In the case of a compound based on a rare earth and on another element, the compound is also based on a rare-earth oxide or oxide hydroxide and on the other element and on anions of the precursors. It may also be in the form of a core based on at least one rare-earth oxide or oxide hydroxide or on an oxide hydroxide chloride or oxide hydroxide acetate surrounded by anions of the precursor of the rare earth, it being understood that one may have a mixed oxide or oxide hydroxide of the rare earth and the other element. For example, in the particular case of a compound based on cerium and zirconium, prepared from cerium acetate, one may have a compound having a core based on at least one oxide or oxide hydroxide of cerium and zirconium, surrounded by acetate anions.

With regard to the respective proportions of the elements involved in the composition of the compounds from step γ) according to the invention, in the case where at least one rare earth is present with an element other than a rare earth, it is desirable for the proportion of rare earth to be at least half, advantageously at least two thirds, preferably at least four fifths by mass with respect to all of the elements expressed in oxide form.

One essential characteristic of the compounds from step γ) according to the invention is their dispersibility in water. This dispersibility in water is at least 50%, more particularly at least 60% and, in the particular case of acidulated water, at least 80%.

The dispersibility is the ratio (P1–P2)/P1 expressed in %, P1 being the initial mass of product in aqueous suspension and P2 the mass of dry residual precipitate obtained after centrifuging the suspension obtained beforehand, separating the mother liquors from the precipitate and drying the latter. The dispersibility in acidulated water is given in the same way, but using a suspension whose pH is 4.

An advantageous characteristic of the compounds from step γ) according to the invention is also their low nitrate content. This content by weight is at most 1000 ppm, more particularly at most 200 ppm and even more particularly at most 100 ppm.

Another characteristic of the compounds from step γ) according to the invention is, in the case of a mixture of salts, their chemical homogeneity. This is because the compounds based on at least one rare earth and on at least one other element chosen from Groups IVa, VIIa, VIII, Ib, IIb, IIIb and IVb have a chemical homogeneity such that the domains of heterogeneity are less than 10 nm². This means that there is no difference in the chemical composition of the products of the invention between regions of 10 nm² in area.

These homogeneity characteristics are determined by EDS-TEM. More particularly, the domains of heterogeneity were measured by the energy-dispersive spectroscopy (EDS) mapping method using a transmission electron microscope (TEM) microprobe.

The particle size of the compounds from step γ) according to the invention may vary depending, in particular, on the method of drying. It may be between 1 and 10 μm. All the sizes given here and in the rest of the description are average sizes.

In the particular case of compounds based on cerium alone or based mostly on cerium, the size of the crystallites is at most 4 nm. This measurement is performed using X-ray spectra and by TEM analysis.

The main advantage of the compounds from step γ) according to the invention is their ability to give aqueous sols or aqueous colloidal suspensions. These aqueous sols will now be described more particularly.

They are obtained by redispersing the compounds described above in water. In order to promote the dispersion of the compounds, it may be advantageous to disperse them in an aqueous medium which is slightly acidified, especially using acetic acid, and having, for example, a pH of approximately 4. Sols are thus obtained whose main characteristics are as follows.

They consist of rare-earth oxides or oxide hydroxides and, optionally, of at least one other metallic element chosen from Groups IVa, VIIa, VIII, Ib, IIb, IIIb and IVb. They are in the form of colloids (or particles) whose size is at most 5 nm (nanometres) and may be between 2 and 5 nm in the case of products based only on one or more rare earths. In the case of products based on at least one rare earth and on another element of the aforementioned type, the size of the colloids is at most 10 nm and preferably at most 5 nm. This colloid size is measured by transmission electron microscopy (TEM). In general, the oxidation state of the metallic elements does not change during preparation of the aqueous-sol and organic-sol particles. However, during the atomization operation, the possibility of the surface atoms (especially of cerium, when this element is used) being oxidized and going to the highest oxidation state cannot be excluded.

Moreover, the nitrate content of these sols, which is measured with respect to the mass of the colloids, is at most 1000 ppm, more particularly at most 200 ppm and even more particularly at most 100 ppm.

Furthermore, the colloids have a chemical homogeneity such that the domains of heterogeneity are less than 10 nm². This chemical homogeneity is measured as previously (EDAX-TEM).

Another characteristic of the aqueous sols of the invention is their slightly acid character. They have, in fact, a pH of at least 3 and more particularly between 5 and 8.

The first step (a) of the process for preparing the organic sol according to the present invention will now be described.

The aqueous sols described above constitute a good aqueous phase comprising, in dispersion, at least one oxygenated metal compound and are very suitable for transfer into an organic phase. The concentration of solid matter of the aqueous phase may vary over a wide range, namely from 1 to 40%, advantageously from 5 to 30% and preferably from 10 to 20% (mass %).

More generally, in order to carry out the process of the invention satisfactorily, it is desirable for the initial aqueous sol to satisfy the following requirements:

the amount of metal in the form of a colloidal oxygenated metal compound must be very high, advantageously 90%, preferably greater than or equal to 95% and, as a general rule, as high as possible;

the concentration of the aqueous sol in the colloidal oxygenated metal compound must be high enough and be preferably between 0.1 and 3 mol/litre; and the aqueous sol must have good thermal stability properties and not flocculate at the reaction temperature, which is greater than 60° C. and usually varies between 80° C. and the boiling point (which varies depending on the pressure).

According to one of the particularly advantageous characteristics of the invention, it is necessary to take care that there are no excessively coarse particles in the aqueous sol and therefore in the final sol. Thus, it is preferable for at most 5%, advantageously at most 1% and preferably at most 0.5% by mass of the particles of the aqueous sol to have a size greater than 0.1 micrometres, advantageously greater than 0.05 micrometres and preferably greater than 0.02 micrometres.

The coarsest particles may be removed by any technique allowing selective removal of particles. This removal may be performed on the aqueous sol, on the organic sol or on both.

However, it is preferred for there to be atable least one separation on the aqueous sol. The preferred technique is centrifuging.

In general, good results are obtained when the aqueous sol is centrifuged at a velocity corresponding to from 1000 to 10,000 G, for one hour. However, centrifuging at a velocity corresponding to 50,000 G may be performed, the limit being merely a technological one.

It should be noted that the centrifuging prior to the step of forming the organic sol, often called the extraction step, is conducive to the latter.

The metal content of the sol according to the invention is advantageously at most equal to ⅔ by mass, and preferably between approximately 10 and 40% (by mass). For use as an additive for onboard diesel, it is preferable for the content not to fall below ⅙ and preferably ⅕.

The organic sols according to the present invention are generally prepared in a known manner by heating an aqueous sol containing the said oxygenated metal compound, in the presence of the said diluent and of the said amphiphilic acid system.

When the sol is produced from several metals, the distribution (in terms of mass and topology) between the various metals of the sol is that of the solid compound dispersed in the aqueous phase.

However, although in the process for preparing the oxygenated metal compound the rare earths are in the lowest oxidation state (III or II in the case of europium), it is preferable, in order to obtain good storage stability, for the surface of the particles to be at least partially at the highest oxidation level when there are several levels. Thus, when an element has several oxidation states (in general, cerium), it is desirable for at least half, advantageously two thirds and preferably three quarters of the surface atoms (to a depth of 3 and advantageously 5 atomic layers) of this element to be in the highest oxidation state. Of course, the said proportion may be distributed throughout the mass and not only in the surface.

The organic liquid medium used in the process of the invention may be an inert aliphatic or cycloaliphatic hydrocarbon or a mixture thereof such as, for example, mineral spirits or petroleum benzins, or mineral ethers or petroleum ethers which may also contain aromatic compounds. Examples include hexane, heptane, octane, nonane, decane, cyclohexane, cyclopentane, cycloheptane and liquid naphthenes. Aromatic solvents such as benzene, toluene, ethylbenzene and xylenes are also suitable, as are petroleum cuts of the Solvesso and Isopar type (trademarks registered by Exxon), especially Solvesso 100 which essentially contains a mixture of methylethylbenzene and trimethylbenzene, Solvesso 150 which contains a mixture of alkylbenzenes, in particular dimethylethylbenzene and tetramethylbenzene, and Isopar L [technical report HDH C 388 (July 1981)] which essentially contains $C_{11}$ and $C_{12}$ isoparaffinic and cycloparaffinic hydrocarbons.

Chlorinated hydrocarbons, such as chlorobenzene or dichlorobenzene and chlorotoluene may also be used, as well as aliphatic and cycloaliphatic ethers, such as diisopropyl ether and dibutyl ether, and aliphatic and cycloaliphatic ketones, such as methyl isobutyl ketone, diisobutyl ketone and mesityl oxide.

Esters may be envisaged, but they have the drawback of running the risk of being hydrolysed. Mention may be made, as esters capable of being used, of those obtained from the acids mentioned in the present application with $C_1$ to $C_8$ alcohols, and in particular the palmitates of a secondary alcohol, such as isopropanol.

The organic liquid or solvent system may be chosen taking into account the solubilizing organic acid (amphiphilic agent) used, of the heating temperature and of the final application of the colloidal dispersion or solution. In some cases, it is preferable to employ a mixture of solvents. The quantity of liquid or solvent obviously defines the final concentration. It is more economical and more convenient to prepare more concentrated dispersions which can be diluted later, when they are used. It is for this reason that the quantity of solvent is not critical.

It may be advantageous to add to the organic phase a promoting agent whose function is to accelerate the transfer of the colloids from the aqueous phase to the organic phase and to improve the stability of the organic sols obtained. By way of promoting agents, compounds having an alcohol function and most particularly linear or branched aliphatic alcohols having from 6 to 12 carbon atoms may be used.

As specific examples, mention may be made of 2-ethyl hexanol, decanol, dodecanol or a mixture thereof.

The proportion of the said agent in the organic phase is not critical and may vary over wide limits.

However, a proportion of from 2 to 15% by weight is generally suitable.

Although the range of acids which can be used is enormous, the total carbon number in the molecule in order to obtain good dissolution is, however, a little more restrictive. The total carbon number (the average carbon number if the acid used is a mixture) of the acids is advantageously greater than 6 and preferably greater than 10; it is also desirable for it to be less than approximately 60.

If it is wished to have high concentrations of rare earth, and especially of cerium or the equivalent, it is desirable to choose acids as short as possible.

These acids may be linear or branched. However, it is preferable for the branches to be either far from the carboxylic functional group or be few in number and carried by different carbon atoms. The carboxylic acids which can be used for the present invention may be aryl, aliphatic or arylaliphatic acids. They may have other functional groups as long as these functional groups are stable in the media in which it is desired to use the rare-earth compounds according to the present invention, especially cerium compounds.

In order for the sol to remain usable at low temperatures, below room temperature, or even below zero degrees Centigrade, it is preferable for the melting point of the acid, or of the mixture of acids, to be at most equal to 50° C., advantageously at most equal to room temperature and preferably at most equal to zero degrees Centigrade.

Thus, carboxylic acids whose carbon chain contains ketone functional groups, such as pyruvic acids substituted in the alpha position by the ketone functional group, may be readily used. This may also apply to alpha-halocarboxylic acids or alpha-hydroxycarboxylic acids.

The chain attached to the carboxylic group may contain unsaturations. However, in general one tends to avoid too many double bonds since cerium, when this element is used, catalyses the crosslinking of double bonds. The chain may be interrupted by ether (optionally, thioether) or ester functional groups as long as they do not excessively alter the lipophilicity of the chain containing the carboxylic group.

Thus, aliphatic carboxylic acids, aliphatic sulphonic acids, aliphatic phosphonic acids, alkylarylsulphonic acids and alkylarylphosphonic acids having approximately 10 to approximately 40 carbon atoms may be used, whether these are natural or synthetic. They may be used by themselves or as mixtures thereof.

By way of paradigmatic examples, mention may be made of fatty acids of tall oil, of coconut oil, of soybean oil, of tallow oil and of linseed oil, oleic acid, linoleic acid, stearic acid and its isomers, [lacuna] acid pelargonic acid, capric acid, lauric acid, myristic acid, dodecylbenzenesulphonic acid, 2-ethylhexanoic acid, naphthenic acid, hexanoic acid, toluenesulphonic acid, toluenephosphonic acid, laurylsulphonic acid, laurylphosphonic acid, palmitylsulphonic acid and palmitylphosphonic acid. Preferably, oleic acid or alkylarylsulphonic acids are used.

The quantity of amphiphilic organic acid used, expressed in number of moles of acid per mole of oxide (lato sensu) may vary over wide limits between 1/10 and 1 mol per atom of rare earth. The upper bound is not of a critical nature, but it is not necessary to involve more acid. Preferably, the organic acid is used in an amount of from 1/5 to 4/5 mol per atom of rare earth.

In the organic phase, the proportion between the organic solvent and the organic acid is not critical. The weight ratio of the organic solvent to the organic acid is preferably chosen to be between 0.3 and 2.0.

The order in which the various reactants are introduced does not matter. A colloidal aqueous dispersion or dispersions, the organic acid, the organic solvent and optionally the promoting agent may be mixed simultaneously. The organic acid, the organic solvent and optionally the promoting agent, which constitute the organic phase, may also be premixed.

The temperature of the reaction mixture is preferably chosen to be within the range of 60° C., to 150° C.

In some cases, because of the volatility of the organic solvent, it is necessary to condense its vapour by cooling down to a temperature below its boiling point.

Advantageously, a working temperature of between 60 and 120° C., preferably between 90 and 110° C., is chosen.

The reaction mixture is stirred continuously throughout the heating period, which may be from at least one hour to approximately one day, preferably between 2 hours and half a day.

reaction mixture over a desiccating agent (including a filter with a hydrophobic membrane), or by adding a third solvent which is inert with respect to the $M^{n+}$ compound, preferably having a boiling point of less than 100° C. and forming an azeotrope with water, followed by distillation of the azeotrope obtained. By way of third solvents suitable for the invention, mention may be made of aliphatic hydrocarbons, such as hexane and heptane, cycloaliphatic:aromatic hydrocarbons, or alcohols such as, for example, ethanol, ethylene glycol, diethylene glycol, etc.

It is preferable, especially for applications as an adjuvant for diesel fuel, for the water content to be at most equal to 1%, advantageously at most equal to 1 part per thousand and preferably at most equal to 100 ppm.

The preferred range is from 15 to 25 carbon atoms for the acids of the said amphiphilic system.

When the system is a mixture of acids, the carbon number may be fractional, since it is then an average, and the constraints on the average are advantageously the same as those above for one of the constituents, or the constituent, of the said amphiphilic system. The minimum constraint is that the average number of carbon atoms of the acids of the said amphiphilic system is at least equal to 10 carbon atoms. More specifically, the average number of carbon atoms of the acids of the said amphiphilic system is advantageously from 11 to 25, preferably from 15 to 25.

In order to obtain better results, especially when the chain length is short (less than 14 carbon atoms), when there is only a single branch and especially when this branch is located in the gamma or delta position with respect to the atom carrying the acid hydrogen, it is highly desirable for this branch to have at least two carbon atoms, advantageously three. In order to explain the nomenclature of the positions, the examples of di(2-ethylhexyl)phosphate acid $HO—P(C_8H_{17})—O—CH_2—CH(C_2H_5)—CH_2(C_3H_7)$ and of 2-ethyloctanoic acid $HO—CO—CH(C_2H_5)—CH_2—CH_2CH_2(C_3H_7)$ will be given below.

| Functional group carrying the proton | Position of the atom (capable of carrying the branch) | | | | Rest of the molecule |
|---|---|---|---|---|---|
| $H^+$ | alpha | beta | gamma | delta | |
| HO | $—P(C_8H_{17})$ | $—O$ | $—CH_2$ | $—CH(C_2H_5)$ | $—CH_2(C_2H_7)$ |
| HO | $—CO$ | $—CH(C_2H_5)$ | $—CH_2$ | $—CH_2$ | $CH_2(C_3H_7)$ |

At the end of the aforementioned heating time, the heating is stopped. The presence of two phases will be noted, namely an organic phase containing, in dispersion, the metal oxide/organic acid complex and a residual aqueous phase.

Next, the organic phase is separated from the aqueous phase using conventional separation techniques, namely decantation, centrifuging, etc.

In accordance with the present invention, colloidal organic dispersions of metal oxide(s) are obtained.

For some applications, it is possible to use the reaction mixture as it is, but sometimes it is desirable to remove the water which may represent from 1 to 3% by weight of the organic phase. For this purpose, the means well known to those skilled in the art are used, for example passing the It is preferred for the longest linear part to be at least 6 carbons, preferably 8 carbons. It is also advantageous for the side chain or chains of the branched acids to have at least two carbon atoms, preferably three carbon atoms.

It is advantageous for the $pK_a$ of at least one of the acids to be at most equal to 5, preferably to 4.5.

It is preferable, especially when the acids are carboxylic acids, for the amphiphilic acid system to be a mixture of acids.

In this case, the conditions on the branch must apply to at least half, advantageously two thirds and preferably four fifths, in moles, of the acids making up the said amphiphilic acid(s) system.

Among the acids giving very good results, mention may be made of phosphorous-containing acids such as phosphoric acids, especially diesters of phosphoric acid, phosphonic acids, and their monoesters, and phosphinic acids.

Among the carboxylic acids giving good results, the acids making up the acid mixture known by the name isostearic acid should be mentioned. The acid system is advantageously isostearic acid itself.

The initial melting point of the amphiphilic acid(s) system is advantageously less than 50° C., more advantageously less than or equal to 20° C., and preferably at most equal to 0° C.

For good stability and good extraction, it is desirable for the molar ratio between the extractant and the tetravalent metal, preferably cerium, to be between 0.1 and 0.6 and preferably between 0.2 and 0.4. This ratio increases when the particle size decreases.

In order to obtain particularly stable sols, as it was shown that the presence of coarse particles impaired the long-term stability of the sols according to the present invention, or even of the sols produced from more conventional acids, it is preferable for at most 5%, advantageously at most 1% and preferably at most 0.5% by mass of the oxide particles to be at most equal to 0.1 micrometres, advantageously at most equal to 0.05 micrometres and preferably at most equal to 0.02 micrometres.

Any diluent resulting in a stable sol comes within the scope of this invention.

The sols according to the present invention may be used in many modes of implementation. Depending on the desired mode of implementation, it is necessary to choose a compromise which takes into account the technical data below; for the synthesis, or indeed for stability, it is desirable to avoid highly non-polar hydrocarbons such as, for example, non-cyclic aliphatic hydrocarbons. Diluents having a polar functional group, such as esters or ethers, give good results but, for some uses, these should be avoided as far as possible. Mixing diluents may provide a solution by compensating for the non-polarity of some diluents by adding polar compounds, generally solvents.

According to one particularly advantageous mode of implementation of the present invention, the sol is used to form a sol diluted in a diesel fuel. The initial sol is generally very concentrated, which limits the freedom of those skilled in the art. Moreover, for reasons of compatibility with the diesel fuel and its many additives, the diluents are then preferably barely polar. As components of a diluent, aromatic or aliphatic compounds are preferable to the compounds having a polar functional group such as, for example ester or ether functional groups.

It is preferable for the diluents to have a kauri-butanol value (measured according to the ASTM D 1133) of less than 105 and advantageously less than 90.

For use as an onboard additive, it is preferable for the melting point of the diluents, or diluent mixtures, to be low and to meet the melting-point constraints described in the present patent with regard to the amphiphilic acid system.

It is also preferable for these diluents to have a very low water solubility, preferably of less than 5% by mass, preferably at most 1% and more preferably at most equal to 0.5% by mass.

In a symmetrical manner, it is also preferable for the water to be soluble in the diluent to at most 5%, preferably at most 1% and more preferably at most 0.5%.

Among the preferred diluents, mention should be made of aromatic hydrocarbon compounds and their mixtures, as well as aliphatic compounds and their mixtures containing less than 50%, preferably less than 25% and more preferably less than 1% of aromatic compounds.

The metal content of the organic sol according to the invention is advantageously at most equal to $2/3$ by mass, preferably between 30 and 40% (by mass). For use as an additive for onboard diesel, it is preferable for the content not to fall below $1/6$ and preferably $1/5$.

The organic sols according to the present invention are generally prepared in a known manner by heating an aqueous sol containing the said metal oxide, in the presence of the said diluent and of the said amphiphilic acid system.

According to one of the particularly advantageous characteristics of the invention, care should be taken to ensure that there are no excessively coarse particles in the aqueous sol and therefore in the final sol.

The coarsest sized particles may be removed by any technique allowing selective removal of the coarsest particles. This removal may be performed on the aqueous sol, on the organic sol or on both.

However, it is preferred for there to be at least one separation on the aqueous sol. The preferred technique is centrifuging.

In general, good results are obtained when the aqueous sol is centrifuged at a velocity corresponding to from 1000 to 10,000 G, for one hour. However, centrifuging at a velocity corresponding to 50,000 G may be performed, the limit being merely a technological one.

It should be noted that the centrifuging prior to the step of forming the organic sol, often called the extraction step, is conducive to the latter.

It may be noted that the extraction efficiency of cerium from the organic phase is very good, since it may reach 90 to 95%.

The presence of colloids whose hydrodynamic diameter is less than 100 Å (10 nm) is demonstrated using quasi-elastic light scattering (that is to say close to the detection limit of the current machines most commonly used). The data obtained show that the $d_{50}$ is between approximately 10 Å (1 nm) and 100 Å (10 nm); the $d_{90}$ is at most equal to 200 Å (20 nm).

The organic sols thus produced show excellent stability. No settling is observed after several months.

The sols according to the present invention, the metal oxide part of which has an appreciable proportion (approximately at least $1/10$, advantageously $1/4$ and preferably $1/2$ in oxide equivalent) of metallic elements, the hydroxide of which precipitates only at quite high values of pH (pH at least equal to approximately 4, advantageously to approximately 5 for a $10^{-2}$M solution), have proved to be difficult to obtain via routes other than that described in the present application. These metallic elements (or metals) are, in particular, the rare earths which have only a single valency, as well as the transition metals whose highest valency is divalent.

According to one of the preferred characteristics of the present invention, the sol is such that, when adjusted to a concentration of metallic cerium content of 30%, the viscosity of the sol at 25° C. is at most equal to 20 mPa·s, advantageously at most equal to 15 mPa·s and preferably at most equal to 10 mPa·s.

It is also preferable for the counteranions of the source cerium solution of the sol to be present in the various sols according to the present invention only at a content at most equal to 0.1, advantageously at most equal to 0.5 and preferably at most equal to 0.03 equivalents per 100 grams of cerium dioxide. This constraint is most particularly valid for the surface layer of the crystallites.

This viscosity may be measured by "low shear", Contraves trademark, by varying the velocity gradient from 0.01 to 1.

The organic sols thus obtained may be diluted in order to obtain concentrations ranging from 10 to 500 and preferably from 50 to 200 ppm. Advantageously, the diluent is a fuel for an internal-combustion engine, preferably diesel; the invention is therefore aimed at sols whose organic phase essentially consists of diesel fuel and of its additives.

The invention also relates to the use of the organic sols prepared according to the invention as desiccants in the paint and varnish industry for the purpose of accelerating the drying of unsaturated oils. The sols according to the invention may also be used in cosmetics.

One of the most beneficial applications relates to the use of these organic sols as combustion adjuvants in the liquid fuels of energy generators such as combustion engines, fuel-oil burners or jet engines.

With regard to the application to diesel fuel, the best results are obtained with diesel fuels of which 95% by mass of the constituents distil, at atmospheric pressure, at a temperature at least equal to 160° C., and advantageously at least equal to 180° C., and of which 95% by mass of the constituents are volatile, at atmospheric pressure, at 400° C., and preferably at 360° C.

The process gives as good results with diesel fuels having a high aromatic content as with diesel fuels having a high aliphatic content as long as the distillation constraints mentioned above are observed.

Thus, the present invention is particularly advantageous for two kinds of fuel, those for which the aromatic content is very high [the aromatic derivative(s) content is at least equal to ⅕ and advantageously at least equal to one third], as it allows the use of these fuels which, without this invention, would lead to deposits which are altogether too troublesome.

Moreover, it is on so-called paraffin fuels (i.e. the said mixtures) whose paraffin content is at least equal to 30% that the effects are most marked. These fuels are being studied for the purpose of meeting new, more restrictive standards. It is desirable for this type of composition that the aromatic content (by mass) be at most equal to ⅕, advantageously at most equal to ¹⁄₁₀ and preferably at most equal to ¹⁄₂₀. The presence of the adjuvant according to the present invention, diluted within the fuel, especially for a diesel engine (diesel fuel), advantageously at a level of from 10 to 200 ppm by mass and preferably from 20 to 100 ppm, has the effect of causing a reduction in the consumption of fuel and in the primary emission of soot, as well as a reduction in the spontaneous ignition temperature of the soot. The latter property is demonstrated in the following examples in which it is evaluated quantitatively either in the laboratory or on an engine test bed.

In the laboratory, the following procedure is carried out:

A carbon black, which it is known can be manufactured reproducibly (ref. ELFTEX 125 No. 137 from Cabot), was selected for these properties in terms of particle size and of specific surface area. The latter properties, respectively 60 nm and 30 $m^2/g$, are of the same order of magnitude as the carbon particles emitted from a diesel engine exhaust. This carbon black is impregnated with the additive so as to obtain a final content of 15% by weight of Ce. This content is representative of what may be obtained in the particles emitted in the exhaust of a diesel engine when an additive is used in the diesel fuel. The impregnation is carried out in the same way as supported catalysts are prepared using a so-called dry-impregnation technique. Some carbon black and the desired quantity of additive are intimately mixed in a glass vessel until a homogeneous paste is obtained. Next, the mixture is dried overnight at 95° C. Monitoring the combustion in air of this impregnated carbon black, by thermogravimetric analysis (TGA), makes it possible to demonstrate the greater or lesser catalytic effect thus generated by the presence of the additive. The additive will be regarded as being more active the lower the corresponding temperature for initiating combustion of the carbon during TGA. A test carried out using a carbon black not impregnated with an additive serves as a reference. The TGA is carried out using a 20 to 25 mg charge of carbon black, with an air flow rate of 3.5 Nl/h and a temperature programming between room temperature and 900° C., at a rate of 10° C./min.

On the engine test bed, the following procedure is carried out:

A Daimler-Benz 240 D diesel engine of 2.4 l swept volume (air) with a manual gearbox is placed on a dynamometric test bed. The exhaust line is equipped with a ceramic particle filter (Corning EX-47 5.66"×6.00"). The temperature of the exhaust gases is measured at the inlet of the particle filter using thermocouples. The differential pressure between the inlet and the outlet of the particle filter is also measured. The additive is added to the fuel so as to produce a concentration of 100 ppm of metal with respect to the additive-containing fuel.

The particle filter is loaded with particles by carrying out 3 consecutive cycles corresponding to the American FTP 75 cycle. Next, the engine speed is fixed so as to correspond to a speed of 90 km/h in fourth gear. The loading is then increased at a constant engine speed in order to cause the exhaust gas temperature to rise. The pressure drop created by the particle filter firstly increases because of the increase in temperature and then it reaches a maximum value before coming down again because of the combustion of the carbonaceous materials which have accumulated in the particle filter. The regeneration point of the corresponding additive is regarded as the point (identified by its temperature) above which the pressure drop no longer increases. As previously, a test carried out without the additive in the fuel determines the reference value.

The following non-limiting examples illustrate the invention.

Common Operating Method

In these examples, the dispersibility in water is measured in the following manner: 1 g of dry product is introduced into a 50 ml volumetric flask, which is topped up with water to 50 ml, and the mixture is stirred for 15 minutes. The suspension obtained is centrifuged at 4500 rpm for 10 min. Next, the mother liquors are separated from the precipitate, which is dried at 120° C. overnight. The dispersibility is given by the ratio (P1−P2)/P1 expressed in %, P1 being the initial mass of 1 g and P2 the mass of the dry residual precipitate. The dispersibility in acidulated water is determined by using the same operating method, but the 50 ml suspension is brought to pH 4 using concentrated acetic acid.

Finally, quasi-elastic light scattering measurement makes it possible to prove that there are colloids in the mother liquors.

The expression "rare earths" should be understood to mean the elements whose atomic number is between 57 and 71 (the lanthanides, including lanthanum) as well as scandium and yttriume.

EXAMPLE 1

Cerium Organic Sol 0.5 l of a 3.6 M solution of $NH_4OH$ are placed in a reactor at room temperature an d vigorously stirred (1600 rpm). 0.5

1 of a 0.6 M cerium acetate solution are introduced using a rapid drip. The pH goes from 11.5 to 9.5 as soon as the cerium III acetate is introduced. The stirring continues for 30 min after introducing all the acetate. The temperature remains at about room temperature. Next, the precipitate obtained by filtering over a No. 4 frit is separated. Next, the precipitate is washed by plunger washing using 2 l of demineralized water.

The precipitate is dried by freeze-drying in 24 h or by spray-drying using a Büchi atomizer. In the latter case, the exit temperature of the solid is 110° C.

TEM analysis shows that the compound obtained has an average individual crystallite size of 2.5 nm. The nitrate content is 80 ppm.

The compound has a dispersibility in water of 95%.

The compound redispersed in demineralized water gives a sol whose pH is 5 and whose colloid size is 4 nm.

15 g of cerium oxide in the form of atomized hydrate are taken up in 100 ml of water so as to obtain an aqueous sol having a concentration of 150 g/l. In order to form 100 g of organic sol, 14.8 g of olein are diluted in 70.2 g of Solvesso 150 (aromatic petroleum cut) so as to obtain an olein/Ce molar ratio of 0.6 and a final concentration of $CeO_2$ in the organic phase of 15%.

The organic phase is brought into contact with the aqueous phase, with gentle stirring (100 rpm) and then the mixture is brought to reflux (100–103° C.) for 4 hours. After decanting, the cerium-loaded organic phase is filtered over a hydrophobic filter and then optionally centrifuged at 4500 rpm. The sol obtained, having a concentration of 10.4%, consists of monodisperse particles of 9 to 10 nm. It is particularly stable over a period of several weeks.

EXAMPLE 2

Ce/Fe Organic Sol

This example relates to the preparation of a cerium/iron compound in respective proportions of 90/10 by weight of oxide.

The procedure begins with an iron acetate solution obtained from iron nitrate by precipitating with aqueous ammonia to pH 7 followed by washing the precipitate and redissolving in acetic acid at pH 1.5. A cerium acetate/iron acetate mixture is formed as a 70 g/l solution in the oxide ratio of 90/10. The latter solution is then made to react continuously with a 4M aqueous ammonia solution. The respective flow rates of the solution and the aqueous ammonia are 24 ml/min and 26 ml/min. The pH of the reaction mixture is 11. The precipitate obtained is dried using a Buchi atomizer under the same conditions as in Example 1.

The product has a dispersibility in water of 65%.

EDS-TEM analysis shows that the heterogeneity is less than 10 $nm^2$.

20 g of Ce/Fe oxide (90/10 by weight of oxide) in the form of atomized hydrate are added to 200 ml of water so as to obtain a 100 g/l aqueous sol. In order to form 100 g of organic sol, 10 g of isostearic acid are diluted in 70 g of Solvesso 150 so as to obtain an isostearic acid/oxide molar ratio of 0.3 and a final mixed-oxide concentration in the organic phase of 20%.

The procedure is repeated as in the previous example in order to transfer over to the organic phase. The organic sol obtained, having a 19% mass concentration of mixed oxide, has a clear black colour with orange-coloured reflections. It is completely stable.

EXAMPLE 3

Ce/La Organic Sol

This example relates to the preparation of a cerium/lanthanum compound in the respective proportions by weight of oxide of 80/20.

A solution containing 135.2 g of cerium acetate and 35.1 g of lanthanum acetate per litre is prepared.

This solution is made to react continuously at a flow rate of 18 ml/min with a 4M aqueous ammonia solution at a flow rate of 26 ml/min. The precipitate is dried using a Buchi atomizer, again under the same conditions.

The compound obtained has a nitrate content of 70 ppm and a dispersibility in water of 60%. EDS-TEM analysis of the product shows a heterogeneity of less than 10 $nm^2$.

20 g of Ce/La oxide (80/20 by weight of oxide) in the form of atomized hydrate are taken up in 200 ml of water so as to obtain a 100 g/l aqueous sol. In order to form 100 g of organic sol, 9 g of isostearic acid are diluted in 71 g of Solvesso 150 so as to obtain an isostearic acid/oxide molar ratio of 0.3 and a final mixed-oxide concentration in the organic phase of 20%.

The procedure is carried out as in Example 1 in order to transfer over to the organic phase. The organic sol obtained, having an 11.2% mass concentration of mixed oxide, has a black colour. It is completely stable.

EXAMPLE 4

Ce/Mn Organic Sol

This example relates to a cerium/zirconium compound having respective proportions by weight of oxides of 82/18.

A solution of cerium chloride and of zirconyl chloride in the required proportions is prepared. This solution is made to react continuously, with stirring at 700 rpm, with a 4M aqueous ammonia solution and the respective flow rates of 20 and 11 ml/min. The pH of the reaction medium is 10.1. The precipitate obtained is dried using a Büchi atomizer, again under the same conditions. The compound has a dispersibility in acidulated water of 51%. EDS-TEM analysis of the product shows a heterogeneity of less than 10 $nm^2$.

30 g of Ce/Mn oxide (90/10 by weight of oxide) in the form of atomized hydrate are taken up in 200 ml of water so as to obtain a 150 g/l aqueous sol. In order to form 100 g of organic sol, 10.6 g of olein are diluted in 59.4 g of Solvesso 150 so as to obtain an olein/oxide molar ratio of 0.2 and a final mixed-oxide concentration in the organic phase of 30%.

The procedure used is as in Example 1 in order to transfer over to the organic phase. The organic sol obtained is completely stable.

EXAMPLE 5

Ce/Cu Organic Sol

This example relates to the preparation of a cerium/copper compound in the respective proportions by weight of oxides of 90/10.

A solution of cerium acetate and copper acetate in the necessary proportions is prepared. This solution is made to react continuously with a 2M sodium hydroxide solution at the respective flow rates of 18 l/min and 26 l/min.

The compound obtained is dried using a Büichi atomizer, again under the same conditions. EDS-TEM analysis of the product shows a heterogeneity of less than 10 $nm^2$.

30 g of Ce/Cu oxide (90/10 by weight of oxide) in the form of an atomized hydrate are taken up in 200 ml of water so as to obtain a 150 g/l aqueous sol. In order to form 100 g of organic sol, 16.5 g of olein are diluted in 46.5 g of Solvesso 150 so as to obtain an olein/oxide molar ratio of 0.3 and a final mixed-oxide concentration in the organic phase of 30%.

The procedure used is as in Example 1 in order to carry out the recovery in organic phase. The organic sol obtained has a clear black colour with blue reflections. It is stable over a period of several weeks.

For some of the above examples, the ignition and regeneration temperatures (measured using the methods described above) are given in the following two tables.

| TGA results | |
|---|---|
| Additives | $T_{ignition}$ (° C.) |
| none | 580 |
| Ce (Example 1) | 305 |
| CeMn (Example 4) | 255 |
| CeCu (Example 5) | 230 |

The results obtained show unambiguously that the ignition temperature of the soot is lowered significantly when the carbon particles are impregnated with an organic sol of the present invention.

Results from the engine test bed

| Additives | $T_{ignition}$ (° C.) |
|---|---|
| none | 600 |
| Ce (Example 1) | 566 |
| CeMn (Example 4) | 550 |
| CeCu (Example 5) | 512 |

The results obtained from the engine test bed show that the regeneration temperature for a particle filter is lowered significantly when the accumulated particles were generated from a fuel to which was added an organic sol of the present invention.

While the present invention has been described through reference to the particular examples and embodiments set forth above, it should not be construed as being limited thereto. To the contrary, certain variations and modifications could be evident to those skilled in the art. The scope of the present invention being limited only to the spirit and scope of the appended claims.

What is claimed is:

1. Process for preparing a colloidal dispersion comprising at least one oxygenated rare-earth compound, comprising the following steps:
   (a) preparing an aqueous phase comprising at least one oxygenated metal compound in dispersion;
   (b) bringing into contact the dispersion of step (a) with an organic phase including at least one amphilic agent to form a reaction mixture; and
   (c) recovering the organic phase; and wherein said oxygenated metal compound is obtained by a process comprising the steps below:
   α) preparing a solution comprising at least one soluble rare-earth salt;
   β) bringing the solution into contact with a basic medium and maintaining the reaction mixture thus formed at a basic pH; and
   γ) recovering the precipitate formed by atomization or freeze-drying.

2. Process according to claim 1, wherein said oxygenated metal compound is based on at least one rare earth and on at least one other element chosen from Groups IVa, VIIa, VIII, Ib, IIb, IIIb and IVb of the Periodic Table of the Elements and wherein the mixture containing at least one acetate or chloride of said rare earth and at least one salt or a sol of said element is prepared by;
   bringing the said mixture into contact with a basic medium and the reaction mixture thus formed is maintained at a basic pH; and
   recovering the precipitate formed by atomization or freeze-drying.

3. Process according to claim 1, wherein said oxygenated metal compound is based on at least one rare earth chosen from cerium, yttrium, neodymium, gadolinium and praseodymium.

4. Process according to claim 1, wherein said oxygenated metal compound furthermore contains at least one other element chosen from zirconium, iron, copper, gallium, palladium and manganese.

5. Process according to claim 1, wherein the reaction medium is maintained at a constant pH when the solution is brought into contact with the basic medium.

6. Process according to claim 1, wherein said contacting operation is carried out by introducing the aforementioned solution into the basic medium.

7. Process according to claim 1, wherein an aqueous ammonia solution is used as the basic medium.

8. Process according to claim 1, wherein the pH of the reaction mixture is maintained at a value of at least 9.

9. Sol comprising:
   particles of oxygenated metal compound having a $d_{90}$ no greater than 20 nm;
   an amphiphilic acid system;
   a diluent;
      wherein the particles of oxygenated metal compound are obtained by a process comprising the steps below:
      a) preparing a solution comprising at least one soluble rare-earth salt;
      b) bringing the solution into contact with a basic medium and maintaining the reaction mixture thus formed at a basic pH; and
      c) recovering the precipitate formed by atomization or freeze-drying.

10. Sol according to claim 9, wherein the molar ratio of said amphiphilic acid to the metallic elements of the sol is at most equal to 0.5.

11. Sol according to claim 9, wherein the side chain or chains of the acids having at least one branch contain at least 2 carbon atoms.

12. Sol according to claim 9, wherein said amphiphilic acid system contains isostearic acid.

13. Sol according to claim 9, wherein said amphiphilic acid system is a diester of phosphoric acid.

14. Sol according to claim 9, wherein the initial melting point of the amphiphilic acid system is at most equal to 50° C.

15. Sol according to claim 9, wherein said sol tetravalent-oxide particles which represent, between them, at most 5%, the size of which particles is greater than 0.1 micrometers.

16. Sol according to claim 9, wherein the diluent contains at most 50% of aromatic compounds.

17. Fuel for an internal combustion engine obtained by mixing a sol according to claim 9 with a standard fuel.

18. An adjuvant for diesel-engine fuels comprising the sol according to claim 9.

19. Process according to claim 1, wherein said amphiphilic agent is an organic mixture or compound acting as a solvent.

20. Process according to claim 1, wherein said soluble rare-earth salt is an acetate or chloride.

21. Process according to claim 2, wherein said mixture is brought into contact with the basic medium.

22. Process according to claim 2, wherein said contacting operation is carried out by introducing the mixture into the basic medium.

23. Process according to claim 8, wherein the pH is between 9.5 and 11.

24. Process according to claim 9, wherein the soluble rare-earth salt is an acetate or chloride.

25. Process according to claim 1, wherein said dispersion of step (a) is added simultaneously with the organic phase in step (b).

26. Process according to claim 1, wherein said dispersion of step (a) is added consecutively to the organic phase in step (b).

27. Process according to claim 1, wherein step β is performed at room temperature.

28. Process according to claim 1, wherein step (a) further comprises acidifying the aqueous phase.

29. Process according to claim 1, further comprising selectively removing coarse particles from the dispersion of step (a) so that no more than 5% by mass of the particles in the aqueous sol have a size greater than 0. 1 micrometers.

30. Process according to claim 1, wherein step (b) is performed at a temperature of 60–120° C.

31. Process according to claim 30, wherein the temperature is 90–110° C.

32. Process according to claim 1, wherein the organic phase comprises at least one organic solvent.

33. Process according to claim 1, wherein the organic phase comprises an agent for promoting transfer of colloids from the aqueous phase to the organic phase.

34. Process according to claim 33, wherein the promoting agent comprises a linear or branched aliphatic alcohol having 6–12 carbon atoms.

35. Process according to claim 1, further comprising the step of:
(d) removing water from the organic phase recovered in step (c) such that the organic phase has no more than 1% water content.

36. Process according to claim 1, further comprising the step of:
(d) adding the organic phase recovered in step (c) to a diluent.

37. Process according to claim 36, wherein the diluent comprises an aromatic hydrocarbon compound.

38. Process according to claim 36, wherein the diluent comprises an aliphatic compound.

39. Process according to claim 1, further comprising heating the reaction mixture of step (b) in the presence of a diluent.

40. Sol according to claim 9, wherein the oxygenated metal compound comprises a compound of at least one rare earth element and at least one other element chosen from Group IVa, VIIa, VIII, Ib, IIb, IIIb, and IV b of the periodic table of elements.

41. Sol according to claim 9, wherein the particles of oxygenated metal compound are at least 50% dispersible in water.

42. Sol according to claim 41, wherein the particles are at least 50% dispersible in water.

43. Sol according to claim 9, wherein the $d_{90}$ is no greater than 10 nm.

44. Sol according to claim 9, wherein the $d_{90}$ is no greater than 5 nm.

45. Sol according to claim 40, wherein the at least one rare earth element comprises cerium and the at least one other element comprises zirconium.

46. Sol according to claim 45, wherein the oxygenated metal compound comprises a core based on at least one of an oxide and an oxide hydroxide of cerium and zirconium, surrounded by acetate anions.

47. Sol according to claim 9, wherein the sol contains at most 1000 ppm of nitrates.

48. Sol according to claim 47, wherein the sol contains at most 100 ppm of nitrates.

49. Sol according to claim 9, wherein the particles of oxygenated metal compound form colloids having domains of heterogeneity which are less than 10 $nm^2$.

50. Sol according to claim 9, wherein the amphilic acid system comprises an organic solvent.

51. Sol according to claim 15, wherein at most 1% of the particles have a size no greater than 0.02 micrometers.

* * * * *